US008379278B2

(12) United States Patent
Kawai (10) Patent No.: US 8,379,278 B2
(45) Date of Patent: Feb. 19, 2013

(54) MULTI-FUNCTION APPARATUS

(75) Inventor: Takamitsu Kawai, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 500 days.

(21) Appl. No.: 12/730,059

(22) Filed: Mar. 23, 2010

(65) Prior Publication Data

US 2011/0075230 A1 Mar. 31, 2011

(30) Foreign Application Priority Data

Sep. 28, 2009 (JP) .................. 2009-222088

(51) Int. Cl.
*H04N 1/04* (2006.01)
(52) U.S. Cl. ........ 358/498; 358/474; 358/497; 358/403; 399/110; 271/278
(58) Field of Classification Search ........... 358/474, 358/1.15, 403, 442, 486, 497, 498, 404; 399/110, 399/393; 271/278
See application file for complete search history.

(56) References Cited

U.S. PATENT DOCUMENTS

| | | | |
|---|---|---|---|
| 7,317,560 B2 * | 1/2008 | Nishinohara et al. ......... | 358/487 |
| 7,733,540 B2 * | 6/2010 | Moribe ......................... | 358/474 |
| 7,804,628 B2 * | 9/2010 | Hashimoto et al. ........... | 358/494 |
| 7,864,300 B2 * | 1/2011 | Lee et al. ....................... | 355/75 |
| 8,027,069 B2 * | 9/2011 | Momose ....................... | 358/497 |
| 8,120,821 B2 * | 2/2012 | Ishida et al. .................. | 358/474 |
| 8,134,758 B2 * | 3/2012 | Nakaishi et al. .............. | 358/474 |
| 8,154,770 B2 * | 4/2012 | Shiraki et al. ................. | 358/401 |
| 8,237,995 B2 * | 8/2012 | Yamazaki et al. ............. | 358/474 |
| 8,279,495 B2 * | 10/2012 | Andoh et al. ................. | 358/471 |
| 2005/0031371 A1 | 2/2005 | Kaida et al. | |
| 2006/0222435 A1 | 10/2006 | Ha et al. | |
| 2008/0003040 A1 | 1/2008 | Sekino et al. | |
| 2008/0156875 A1 | 7/2008 | Kinoshita et al. | |

FOREIGN PATENT DOCUMENTS

| | | |
|---|---|---|
| CN | 1847012 A | 10/2006 |
| CN | 101096154 A | 1/2008 |
| EP | 1939790 A1 | 7/2008 |

(Continued)

OTHER PUBLICATIONS

The State Intellectual Property Office of the People'S Republic of China, Notification of First Office Action and Search Report for Chinese Patent Application No. 201010147504.8 (counterpart Chinese patent application), issued Nov. 19, 2012.

*Primary Examiner* — Negussie Worku
(74) *Attorney, Agent, or Firm* — Baker Botts L.L.P.

(57) ABSTRACT

An multi-function apparatus includes a body, an openable image reading unit and an openable document cover. The image reading unit includes a locking member including a first engaging portion capable of engaging the body and a second engaging portion capable of engaging the document cover. The locking member is configured to be movable between a first position and a second position. When the locking member is moved to the first position, the first engaging portion engages the body and the image reading unit is locked to the closed position. When the locking member is moved to the second position, the second engaging portion engages the document cover, and the document cover is locked to the closed position. The multi-function apparatus further comprises a first urging member which urges the locking member at the second position when the image reading unit is in the opened position and a second urging member which urges the locking member at the first position when the document cover is in the opened position.

10 Claims, 10 Drawing Sheets

FOREIGN PATENT DOCUMENTS

| JP | H09-190020 A | 7/1997 |
| JP | 2002-303943 A | 10/2002 |
| JP | 2002-365742 A | 12/2002 |
| JP | 2005-062326 A | 3/2005 |
| JP | 2005-210624 A | 8/2005 |
| JP | 2006-042003 A | 2/2006 |

* cited by examiner

MULTI-FUNCTION APPARATUS

CROSS REFERENCE TO RELATED APPLICATION

The present application claims priority from Japanese Patent Application No. 2009-222088, filed on Sep. 28, 2009, the disclosure of which is incorporated herein by reference in its entirely.

BACKGROUND

1. Technical Field

The present invention relates to a multi-function apparatus including a document cover and an image reading unit, more specifically, to a multi-function apparatus including a locking mechanism configured to lock the document cover or the image reading unit.

2. Description of the Related Art

A multi-function apparatus is known. The multi-function apparatus includes a document cover, an image reading unit and a body, and is configured not to allow both the image reading unit and the document cover to be opened simultaneously. The multi-function apparatus further includes a first locking mechanism configured to lock the image reading unit so as not to be opened with respect to the body, and a second locking mechanism configured to lock the document cover so as not to be opened with respect to the image reading unit. The first locking mechanism and the second locking mechanism are independent each other, and act independently.

SUMMARY

However, the first locking mechanism and the second locking mechanism of the above-described multi-function apparatus are configured to act independently and, when one of the first locking mechanism and the second locking mechanism is not operated normally, there are probabilities that both the image reading unit and the document cover are opened simultaneously or that neither the image reading unit nor the document cover can be opened.

A need has arisen to provide a multi-function apparatus with high reliability such that only one of the image reading unit and the document cover can be opened.

According to an embodiment of the present invention, an multi-function apparatus comprises a body, an image reading unit and an document cover. The image reading unit has a document placing surface and is configured to read an image of a document placed on the document placing surface. The image reading unit is movable between a closed position to cover an upper portion of the body and an opened position to open the upper portion. The document cover is movable between a closed position to cover the document placing surface and an opened position to open the document placing surface. The image reading unit includes a locking member. The locking member includes a first engaging portion capable of engaging the body and a second engaging portion capable of engaging the document cover. The locking member is configured to be movable between a first position and a second position. When the locking member is moved to the first position, the first engaging portion engages the body and the image reading unit is locked to the closed position, and the second engaging portion is disengaged from the document cover so that the document cover is movable to the opened position. When the locking member is moved to the second position, the first engaging portion is disengaged from the body and the image reading unit is allowed to move to the opened position, and the second engaging portion engages the document cover, and the document cover is locked to the closed position. The multi-function apparatus further comprises a first urging member which urges the locking member at the second position when the image reading unit is in the opened position, and still further comprises a second urging member which urges the locking member at the first position when the document cover is in the opened position.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DESCRIPTION OF PREFERRED EMBODIMENTS

Embodiments of the invention and their features and advantages may be understood by referring to FIGS. 1-10, like numerals being used for like corresponding parts in the various drawings. In the description given below, an entire configuration of a color printer as an example of an image forming apparatus in brief first, and then characteristic portions of the invention will be described in detail.

Figure 1:
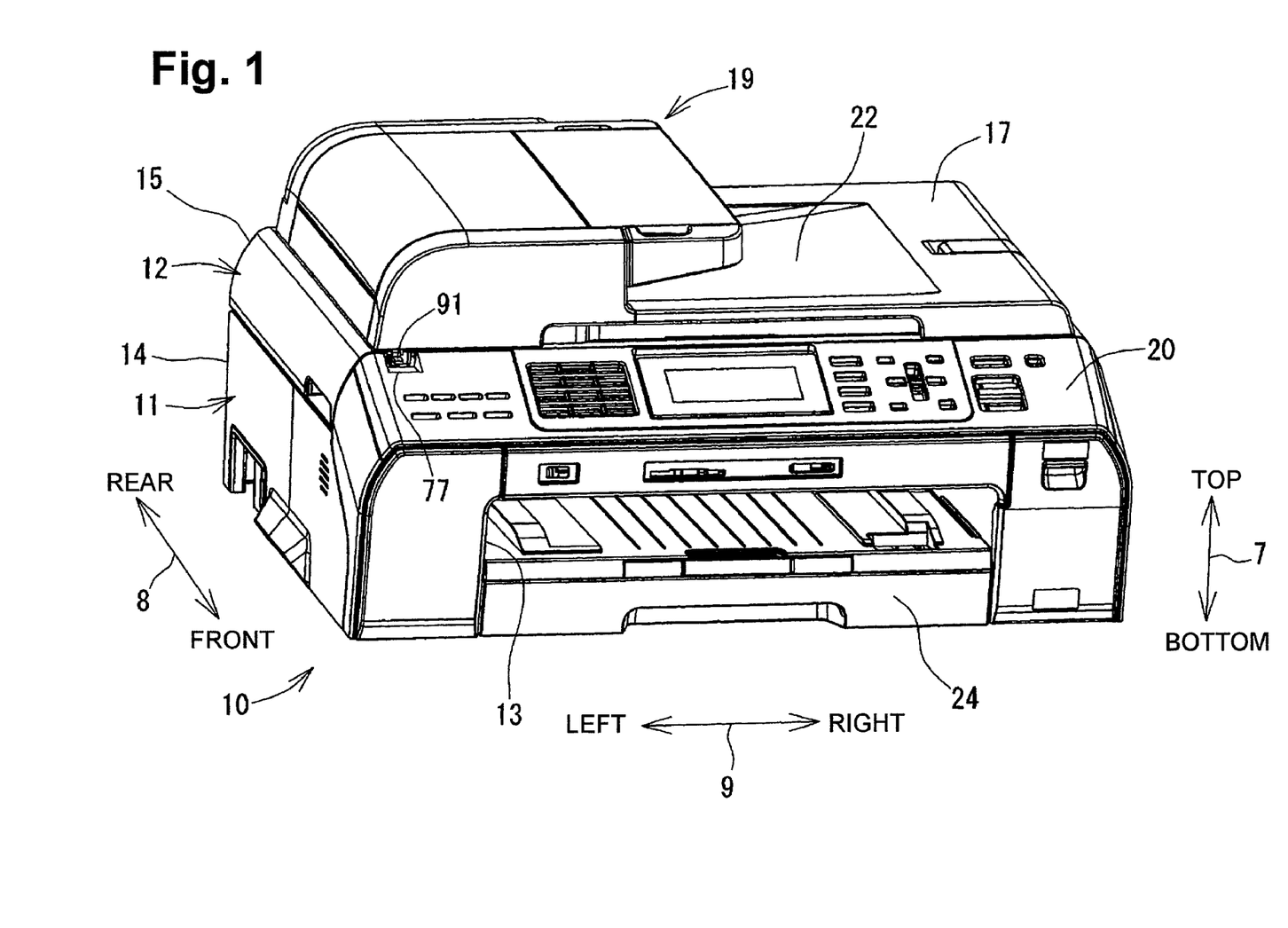
FIG. 1 is an appearance perspective view of a multi-function apparatus according to an embodiment of an image printing apparatus of the invention.

FIG. 1 is a perspective view showing an appearance of a multi-function apparatus 10 according to an embodiment of the invention. In the following description, a vertical direction 7 is defined with reference to the state in which the multi-function apparatus 10 is installed to be ready to use (the state in FIG. 1), a fore-and-aft direction 8 is defined with the side having an opening 13 as a near side (front), and a lateral direction 9 is defined by viewing the multi-function apparatus 10 from the near side (front).

Figure 2A:
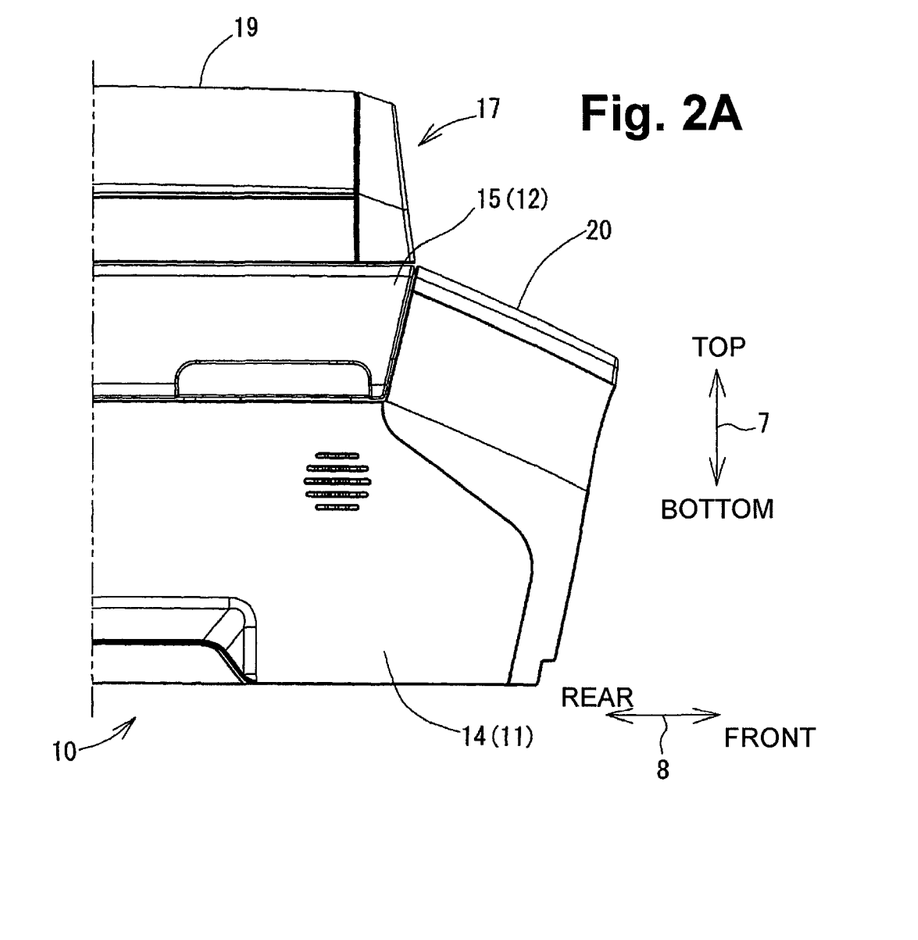
FIG. 2A is a partly enlarged side view of the multi-function apparatus.
Figure 2B:
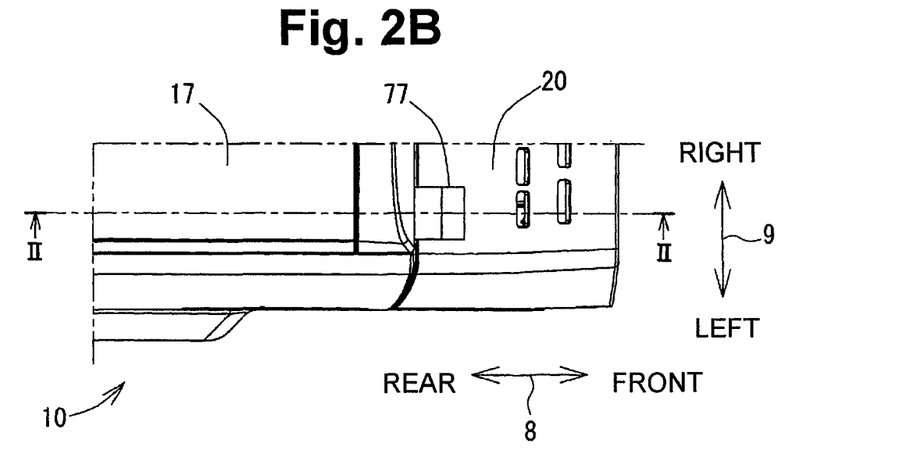
FIG. 2B is an enlarged plan view of a left end portion of the multi-function apparatus 10.

The multi-function apparatus 10 is formed into a substantially thin parallelepiped having a large width (the length in the lateral direction 9) and depth (the length in the fore-and-aft direction 8) larger with respect to a height (the length in the vertical direction 7) as show in FIG. 1, FIG. 2A, and FIG. 2B. The multi-function apparatus 10 has a variety of functions such as the facsimile function, the printing function, the scanning function, and the copying function. The multi-function apparatus 10 is not limited to those having all the functions described above.

An ink jet printing type printer device 11 is provided in the lower portion of the multi-function apparatus 10. The printer device 11 includes a body 14 formed with the opening 13 in the front. A tray 24 for storing one or more pieces of printing paper is mounted at the opening 13. The printer device 11 is not limited to those of the ink jet printing type, and may be of the electro-photographic type or of the thermal transfer type.

A scanner device 12 is provided on the top of the printer device 11. The scanner device 12 includes an image reading unit 15 including a contact glass 15B on an upper surface thereof. The document to be subjected to reading is placed on the upper surface of the contact glass 15B (an example of a document placing surface).

The image reading unit 15 is supported by a supporting mechanism such as a hinge or the like at the rear portion of the multi-function apparatus 10 so as to be capable of being opened and closed with respect to the upper surface of the body 14. Accordingly, the image reading unit 15 is rotatable between a closed position (the position shown in FIG. 1, FIG. 6A, and FIG. 6B) covering the upper surface of the body 14 and an opened position (the position shown in FIG. 7A and FIG. 7B) being apart upward from the upper surface of the body 14. In this embodiment the upper surface of the body 14 is opened. Therefore, when the image reading unit 15 is opened upward as shown in FIG. 7A and FIG. 7B and the upper surface of the body 14 is exposed, the user is allowed to access the interior thereof from the upper surface of the body 14. Then, the user is able to perform maintenance of components in the printer device 11 or paper jamming treatment. In this manner, the image reading unit 15 serves as a cover which covers the upper surface of the body 14.

An operation panel 20 is provided on the front side of the scanner device 12. Predetermined commands for causing the printer device 11 and the scanner device 12 to perform desired actions are input via the operation panel 20.

A document cover 17 for covering the document placed on the contact glass is provided on the upper portion of the scanner device 12. The document cover 17 is supported by the supporting mechanism such as the hinge at the rear portion of the multi-function apparatus 10 so as to be capable of being opened and closed with respect to the contact glass on the upper surface of the image reading unit 15. Accordingly, the document cover 17 is rotatable between a closed position (the position shown in FIG. 1, FIG. 4A, and FIG. 4B) covering the upper surface of the contact glass and an opened position (the position shown in FIG. 5A and FIG. 5B) being apart from the upper surface of the contact glass.

The document cover 17 is provided with an ADF (Auto Document Feeder) 19. The ADF 19 is provided at the left end portion of the document cover 17. The ADF 19 picks up a plurality of documents set at a predetermined position one by one, transports the same so as to pass through a reading position on the contact glass, and discharges the document into a document discharging portion 22.

[Locking Mechanism 50]

Figure 3A:
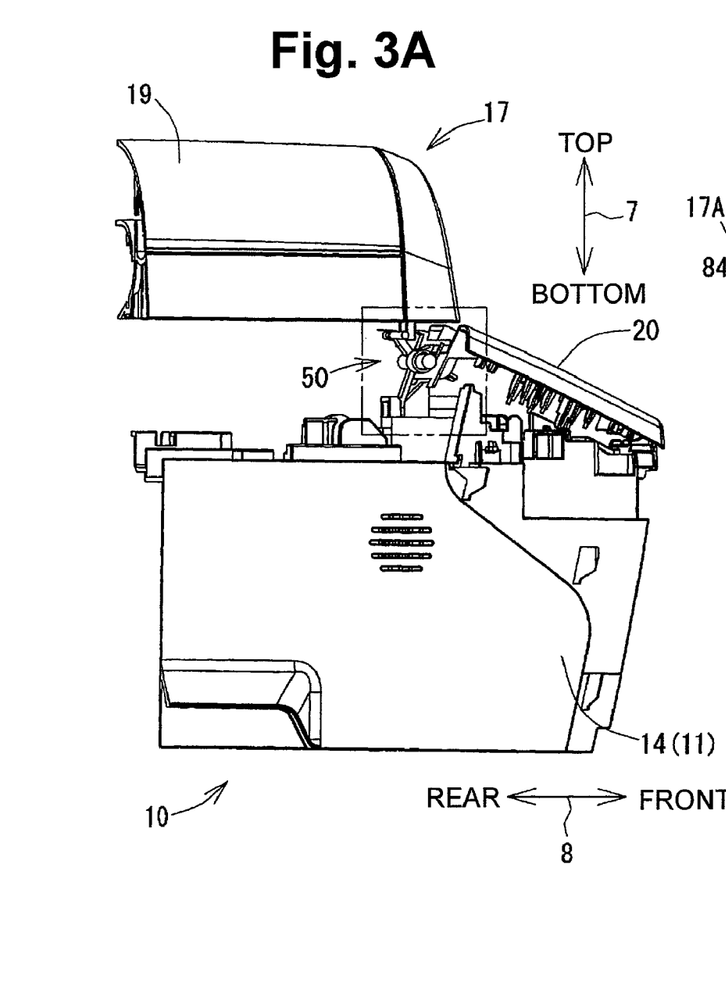
FIG. 3A is a side view of a state in which part of a left side wall of the multi-function apparatus is removed.

Referring now to FIG. 3A to FIG. 8B, a locking mechanism 50 will be described. As shown in FIGS. 3A and 3B, the multi-function apparatus 10 is provided with the locking mechanism 50. In FIGS. 3A and 3B, a state of being rotated slightly rightward about a vertical axis thereof is shown for the convenience of description of respective components of the locking mechanism 50. In FIGS. 3A and 3B, a state in which the image reading unit 15 and a left side wall of the operation panel 20 are removed is shown, and the locking mechanism 50 provided in the image reading unit 15 is shown in detail. The locking mechanism 50 is provided at the left end portion on the front side of the multi-function apparatus 10. The locking mechanism 50 has a role to engage the image reading unit 15 and the body 14 to lock the same and a role to engage the image reading unit 15 and the document cover 17 to lock the same.

Figure 3B:
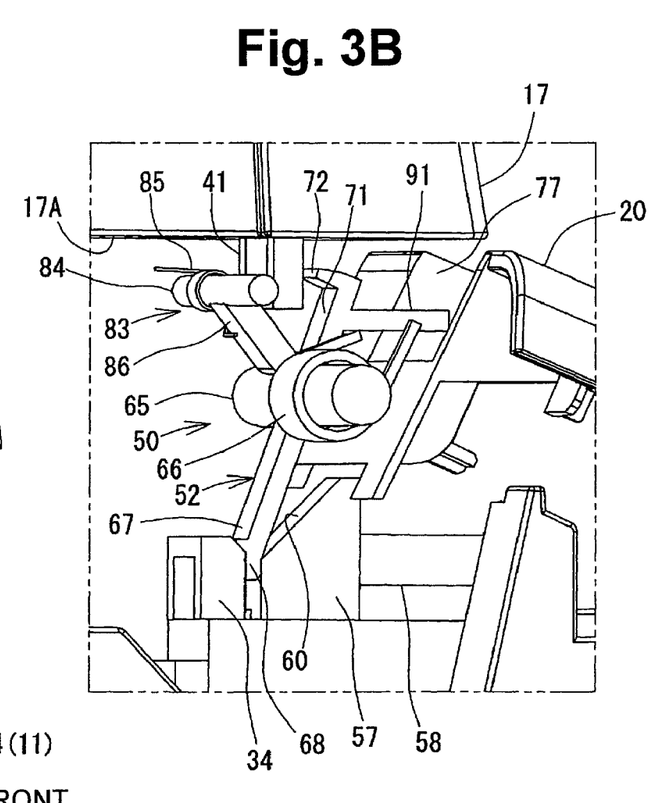
FIG. 3B is a partly enlarged view of a locking mechanism.

As shown in FIG. 3B, the locking mechanism 50 includes a pivoting member 52 (an example of a locking member). The pivoting member 52 includes a supporting shaft 65, a first arm 67 (an example of a first arm member) extending from the center portion of the supporting shaft 65 in the direction vertical to the supporting shaft 65 and a second arm 71 (an example of a second arm member) extending in the direction opposite from the first arm 67. The supporting shaft 65 extends in the lateral direction 9 in the image reading unit 15, and both ends thereof are supported by bearing portions, not shown, provided on the image reading unit 15. Accordingly, the pivoting member 52 is allowed to pivot about the supporting shaft 65. In this embodiment, the pivoting member 52 is configured to be pivotable between a first pivotal position and a second pivotal position, described later.

A first hook 68 is provided at a distal end of the first arm 67. A first engaging portion is realized by the first arm 67 and the first hook 68. The first hook 68 is configured to be engaged with the body 14. More specifically, the first hook 68 is formed into a dogleg shape projecting rearward from the distal end of the first arm 67 so as to allow engagement with a first engaging strip 34 (an example of an engaged portion) provided on the body 14.

The first engaging strip 34 is formed integrally with the body 14 formed into an inverted U-shape projecting upward from the body 14. An opening 80 (see FIG. 4B) is formed on a lower wall 15A of the image reading unit 15 at a position corresponding to the first engaging strip 34. When the image reading unit 15 is in the closed position in which the upper surface of the body 14 is closed, the first engaging strip 34 enters the image reading unit 15 through the opening 80. In this embodiment, the first hook 68 is engageable with the first engaging strip 34 entered into the image reading unit 15. For details, the first hook 68 is moved rearward in the process of clockwise pivotal movement of the pivoting member 52, and is engaged from the front side of the first engaging strip 34 when the pivoting member 52 assumes the first pivotal position shown in FIG. 4B. Accordingly, the image reading unit 15 and the body 14 are locked so as to be prevented from coming apart in the vertical direction 7. The first hook 68 and the first engaging strip 34 may have any configuration as long as they are engageable with each other as described above.

Figure 4A:
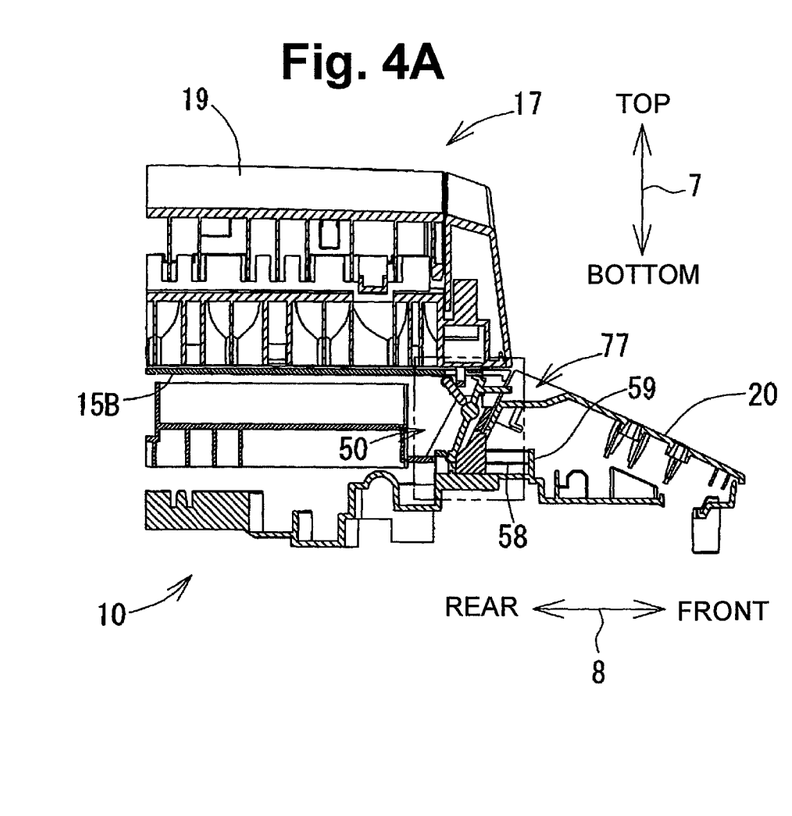
FIG. 4A is a partly cross-sectional view of the multi-function apparatus when a document cover and an image reading unit are in a closed position taken along a cutting line II-II.
Figure 4B:
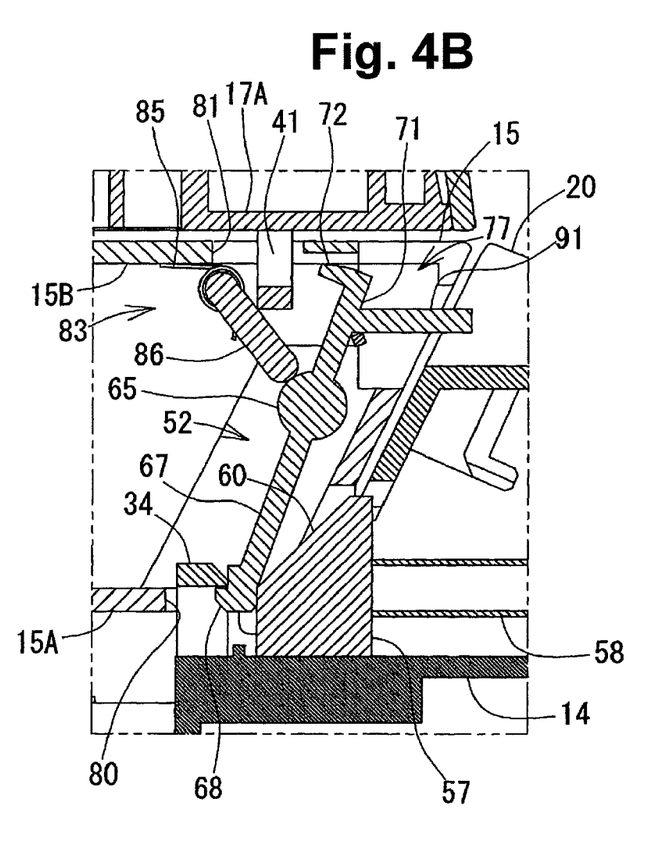
FIG. 4B is a partly enlarged cross-sectional view of the locking mechanism when the document cover and the image reading unit are in the closed position taken along the cutting line II-II.

Here, the first pivotal position is a position in which the first hook 68 engages the first engaging strip 34 as shown in FIG. 4B. When the pivoting member 52 assumes the first pivotal position, a second hook 72 is arranged at a position apart to the front from a second engaging strip 41 as shown in FIG. 4B, so that the second hook 72 and the second engaging strip 41 cannot be engaged (non-engagement state).

The second hook 72 is provided at the distal end of the second arm 71. A second engaging portion is realized by the second arm 71 and the second hook 72. The second hook 72 is configured to be engaged with the document cover 17. More specifically, the second hook 72 is formed into a dogleg shape projecting rearward from the distal end of the second arm 71 so as to allow engagement with the second engaging strip 41 provided on the document cover 17.

The second engaging strip 41 is a U-shaped member projecting downward from a lower wall 17A of the document cover 17. An opening 81 (see FIG. 4B) is formed on an upper wall of the image reading unit 15 at a position corresponding to the second engaging strip 41. When the document cover 17 is in the closed position in which the upper surface of the image reading unit 15 is closed, the second engaging strip 41 enters the image reading unit 15 through the opening 81. In this embodiment, the second hook 72 is engageable with the second engaging strip 41 entered into the image reading unit 15. For details, the second hook 72 is moved rearward in the process of counterclockwise pivotal movement of the pivoting member 52, and is engaged from the front side of the second engaging strip 41 when the pivoting member 52 assumes the second pivotal position shown in FIGS. 6A and 6B. Accordingly, the image reading unit 15 and the document cover 17 are locked so as to be prevented from coming apart in the vertical direction 7. The second hook 72 and the second engaging strip 41 may have any configuration as long as they are engageable with each other as described above.

Figure 6A:
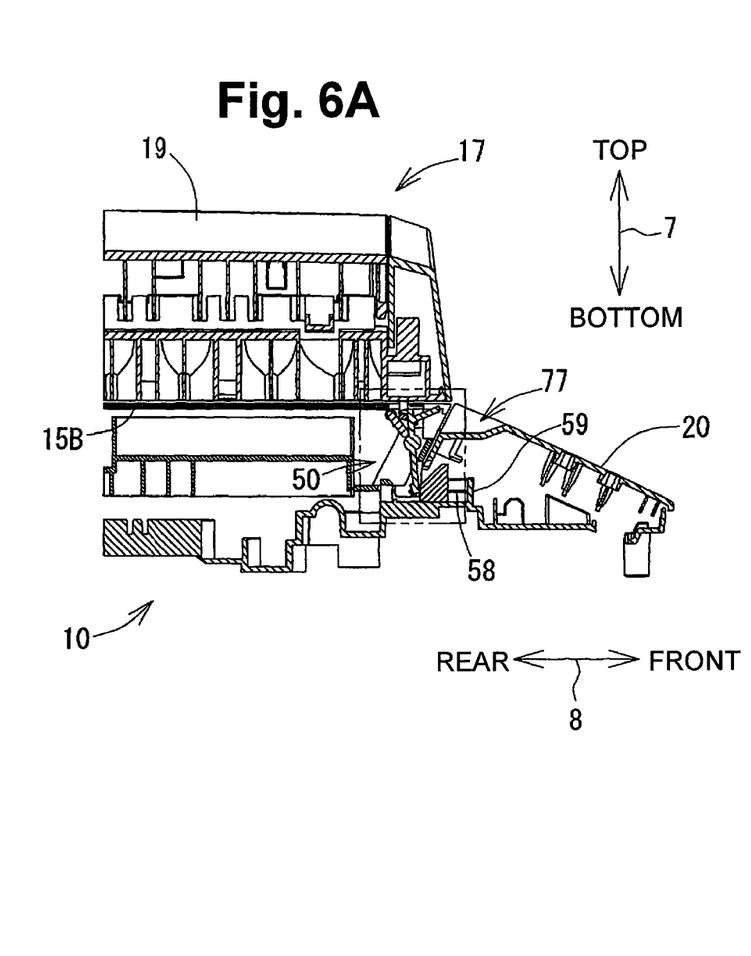
FIG. 6A is a partly cross-sectional view of the multi-function apparatus when an operation lever is operated taken along the cutting line II-II.
Figure 6B:
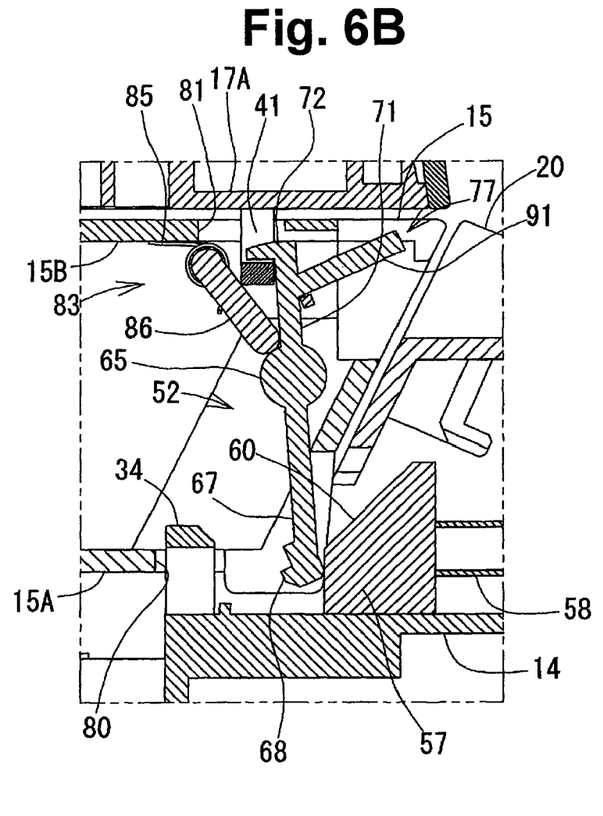
FIG. 6B is a partly enlarged cross-sectional view of the locking mechanism when the operation lever is operated taken along a cutting line II-II.
Figure 7A:
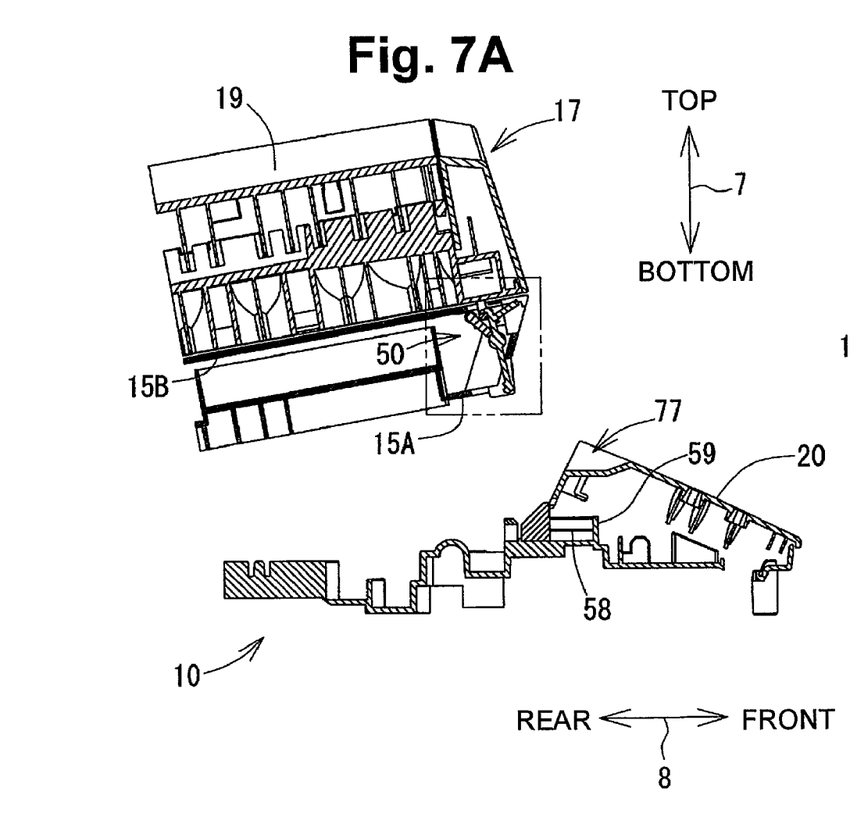
FIG. 7A is a partly cross-sectional view of the multi-function apparatus when the image reading unit is in the opened position taken along the cutting line II-II.
Figure 7B:
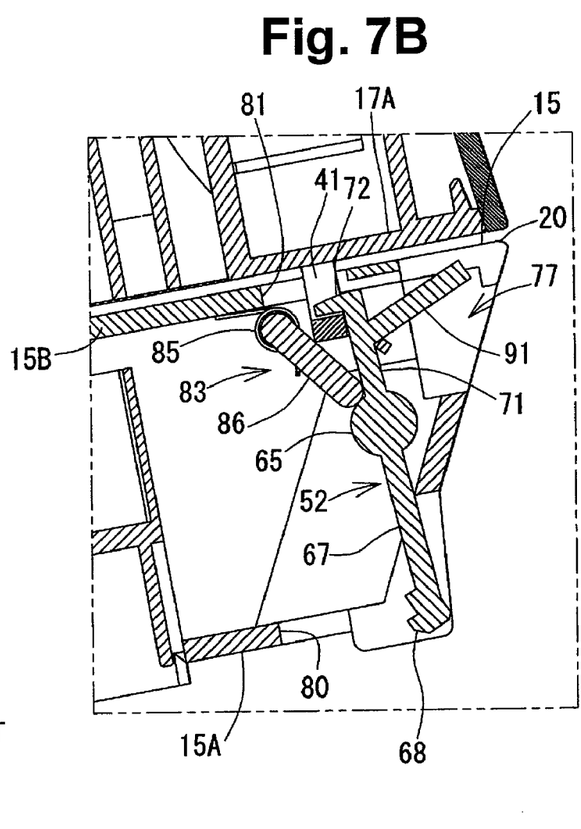
FIG. 7B is a partly enlarged cross-sectional view of the locking mechanism when the image reading unit is in the opened position taken long the cutting line II-II.

Here, the second pivotal position is a position in which the second hook 72 engages the second engaging strip 41 as shown in FIGS. 6A and 6B. When the pivoting member 52 assumes the second pivotal position, the first hook 68 is arranged at a position apart to the front from the first engaging strip 34, so that the first hook 68 and the first engaging strip 34 cannot be engaged (non-engagement state).

As shown in FIG. 3B, a torsion coil spring 66 (an example of a first urging member) is provided on the supporting shaft 65. The torsion coil spring 66 is supported within the image reading unit 15 in a state in which the supporting shaft 65 is inserted through an inner hole thereof. In this embodiment, the pivoting member 52 is urged counterclockwise in FIG. 3B by the torsion coil spring 66. Accordingly, the pivoting member 52 receives a counterclockwise angular moment F1. Therefore, when an external force other than the angular moment F1 generated by being urged by the torsion coil spring 66 is not applied to the pivoting member 52, the pivoting member 52 receives the angular moment F1 and pivots counterclockwise. Then, the pivotal movement of the pivoting member 52 is stopped by the engagement of the second hook 72 with the second engaging strip 41, and the pivoting member 52 maintains the first pivotal position.

The body 14 is provided with a guide member 57 supported so as to be movable in the fore-and-aft direction 8, and a coil spring 58 resiliently urging the guide member 57 rearward. The guide member 57 and the coil spring 58 construct an example of a second urging member. The guide member 57 is supported so as to be movable in the fore-and-aft direction 8 on the front side of the first engaging strip 34. An inner wall 59 for receiving the spring is provided on the further front side of the guide member 57, and the coil spring 58 in the compressed state is provided between the inner wall 59 and the guide member 57. Accordingly, the guide member 57 is urged rearward by the coil spring 58.

The guide member 57 is formed with a guide surface 60 inclined rearward and obliquely downward from an upper end thereof on the rear side thereof. The guide surface 60 guides the first hook 68 rearward and obliquely downward along the guide surface 60 in the process that the image reading unit 15 is moved from the opened position to the closed position. Then, when the image reading unit 15 assumes the closed position, the first hook 68 is guided to a position to allow the engagement with the first engaging strip 34. Then, the urging force of the coil spring 58 rearward is transmitted to the first hook 68 via the guide member 57 so that the first hook 68 engages the first engaging strip 34.

In this embodiment, when the image reading unit 15 assumes the closed position, the first hook 68 is urged by the coil spring 58 clockwise in FIG. 3B. Accordingly, the pivoting member 52 receives a clockwise angular moment F2. The angular moment F2 is larger than the counterclockwise angular moment F1 described above. Therefore, when the image reading unit 15 assumes the closed position and an external force other than the angular moment F1 generated by being urged by the coil spring 66 and the angular moment F2 generated by being urged by the coil spring 58 is not applied to the pivoting member 52, the pivoting member 52 is pushed rearward by the guide member 57, and maintains the first pivotal position in which the first hook 68 engages the first engaging strip 34.

As shown in FIG. 3B, the second arm 71 is provided with an operation lever 91 (an example of operation member) extending toward the front. The operation lever 91 is integrally formed with the second arm 71. The operation lever 91 is inserted through a notched groove 77 formed at the left end portion of the operation panel 20. Accordingly, the operation lever 91 is exposed from the upper surface of the operation panel 20 through the notched groove 77. The user is able to input the external force in a desired pivotal direction to the pivoting member 52 by operating the operation lever 91 from the outside. In this embodiment, the operation lever 91 is integrally formed with the second arm 71. For example, however, a configuration in which the pivoting member 52 and the operation lever 91 are formed as separate members, and the force input to the operation lever 91 is transmitted to the pivoting member 52 via a link member or the like provided therebetween is also employable.

As shown in FIG. 3B, a restricting member 83 is provided rearward and obliquely upward of the supporting shaft 65. The restricting member 83 includes a supporting shaft 84, a torsion coil spring 85, and a restricting arm 86. The supporting shaft 84 is supported by a supporting portion, not shown, provided on the image reading unit 15. The restricting arm 86 is an arm-type member extending from the supporting shaft 84 in the vertical direction. The torsion coil spring 85 is provided on the supporting shaft 84. The torsion coil spring 85 is supported within the image reading unit 15 in a state in which the supporting shaft 84 is inserted through an inner hole thereof. In this embodiment, the restricting member 83 is urged counterclockwise in FIG. 3B by the torsion coil spring 85.

The restricting member 83 is arranged downward of the opening 81. More specifically, the restricting member 83 is arranged at a position where a movable range of the restricting arm 86 and a range of insertion of the second engaging strip 41 overlap with each other. Accordingly, when the document cover 17 assumes the closed position and the second engaging strip 41 enters the image reading unit 15 from the opening 81, the second engaging strip 41 pushes the restricting arm 86 downward. The length of the restricting arm 86 is set to a range which allows abutment of the distal end of the restricting arm 86 with the second arm 71 when the pivoting member 52 assumes the first pivotal position. Therefore, when the document cover 17 is moved to the opened position, downward pressure applied by the second engaging strip 41 is released, whereby the restricting arm 86 pivots counterclockwise and the distal end of the restricting arm 86 comes into abutment with the second arm 71. At this time, since the restricting arm 86 props the pivoting member 52, counterclockwise pivotal movement of the pivoting member 52 is restrained.

[Opening and Closing Actions of Document Cover 17 and Actions of Locking Mechanism 50]

Referring now to FIGS. 4A to 5B, the opening and closing actions of the document cover 17 and the actions of the locking mechanism 50 in association with the opening and closing actions of the document cover 17 will be described.

FIGS. 4A and 4B show a state in which the image reading unit 15 and the document cover 17 both assume the closed position. At this time, the pivoting member 52 maintains the first pivotal position in which the first hook 68 engages the first engaging strip 34, and the second hook 72 disengages the second engaging strip 41.

Figure 5A:
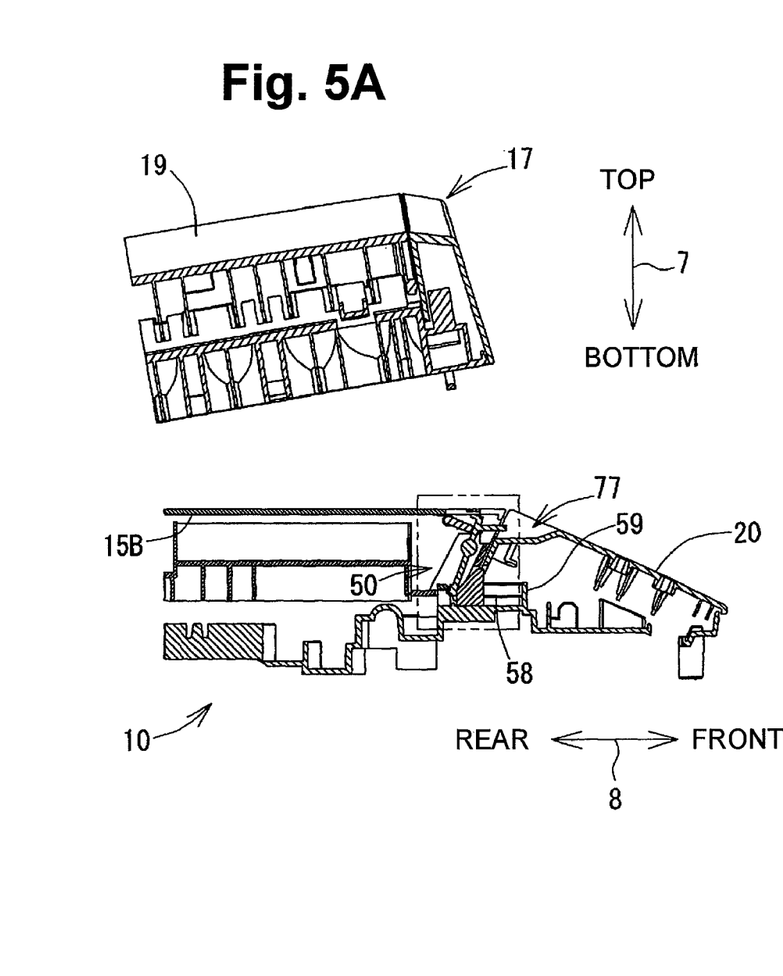
FIG. 5A is a partly cross-sectional view of the multi-function apparatus when the document cover is in an opened position taken along the cutting line II-II.
Figure 5B:
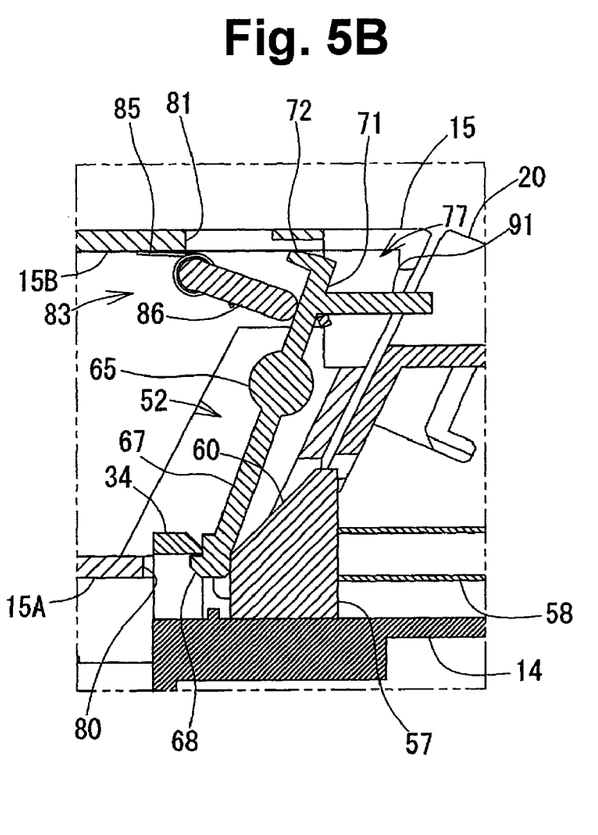
FIG. 5B is a partly enlarged cross-sectional view of the locking mechanism when the document cover is in the opened position taken along the cutting line II-II.

As shown in FIGS. 5A and 5B, when the document cover 17 is lifted and is rotated from the closed position to the opened position, the second engaging strip 41 also moves upward. At this time, since the downward pressure applied to the restricting arm 86 by the second engaging strip 41 is released, and hence the restricting arm 86 pivots counterclockwise about the supporting shaft 84. Then, the restricting arm 86 stops in a state of being in abutment with the second arm 71. At this time, even when the counterclockwise external force is applied to the pivoting member 52 by an unintentional operation of the operation lever 91, the counterclockwise pivotal movement of the pivoting member 52 is restrained by the restricting arm 86, and hence the pivoting member 52 maintains the first pivotal position in a state of being applied with the angular moment F2 by being urged by the guide member 57.

When the document cover 17 is returned back to the closed position, the restricting arm 86 is pushed downward by the second engaging strip 41 entered into the opening 81, and the restraint of the pivoting member 52 by the restricting arm 86 is released.

Since the locking mechanism 50 acts in this manner, even when the document cover 17 is fully opened, the image reading unit 15 is locked to the body 14. Therefore, the image reading unit 15 is prevented from being opened in a state in which the document cover 17 is opened. Since the second arm 71 is pressed forward by the restricting arm 86, the operation of the operation lever 91 is disabled. Therefore, the locked state between the image reading unit 15 and the body 14 is prevented from being released by the unintentional operation. In other words, the document cover 17 and the image reading unit 15 cannot be opened simultaneously.

[Opening and Closing Actions of Image Reading unit 15 and Actions of Locking Mechanism 50]

Referring now to FIGS. 6A to 8B, the opening and closing actions of the image reading unit 15 and the actions of the locking mechanism 50 in association with the opening and closing actions of the image reading unit 15 will be described.

As shown in FIGS. 6A and 6B, when the operation lever 91 is pushed upward in a state in which the image reading unit 15 and the document cover 17 both assume the closed position, the pivoting member 52 pivots counterclockwise against the angular moment F2. Accordingly, the pivoting member 52 is changed in position from the first pivotal position to the second pivotal position. In other words, the pivoting member 52 assumes the non-engagement state in which the second hook 72 engages the second engaging strip 41, and engagement between the first hook 68 and the first engaging strip 34 is released.

When the image reading unit 15 is lifted and is rotated from the closed position to the opened position in a state in which the pivoting member 52 assumes the second pivotal position, the image reading unit 15 is moved apart from the body 14 as shown in FIGS. 7A and 7B. When the image reading unit 15 moves apart from the body 14, the pivoting member 52 moves apart from the first engaging strip 34 and the guide member 57 correspondingly. Therefore, the pivoting member 52 is no longer applied with the angular moment F2 by being urged by the guide member 57. Therefore, the pivoting member 52 is applied only with the angular moment F1 by being urged by the torsion coil spring 66. Accordingly, even when the user stops the operation of the operation lever 91, the pivoting member 52 is still applied with the counterclockwise angular moment F1, and hence maintains the second pivotal position.

With the actions of the locking mechanism 50 as described above, even when the image reading unit 15 is fully opened rearward, since the document cover 17 is locked to the image reading unit 15, and hence the document cover 17 is prevented from being opened in a state in which the image reading unit 15 is opened. Even when the user stops the operation of the operation lever 91 in a state in which the image reading unit 15 assumes the opened position, the pivoting member 52 is still applied with the counterclockwise angular moment F1, and hence maintains the second pivotal position. In other words, the document cover 17 and the image reading unit 15 cannot be opened simultaneously.

Figure 8A:
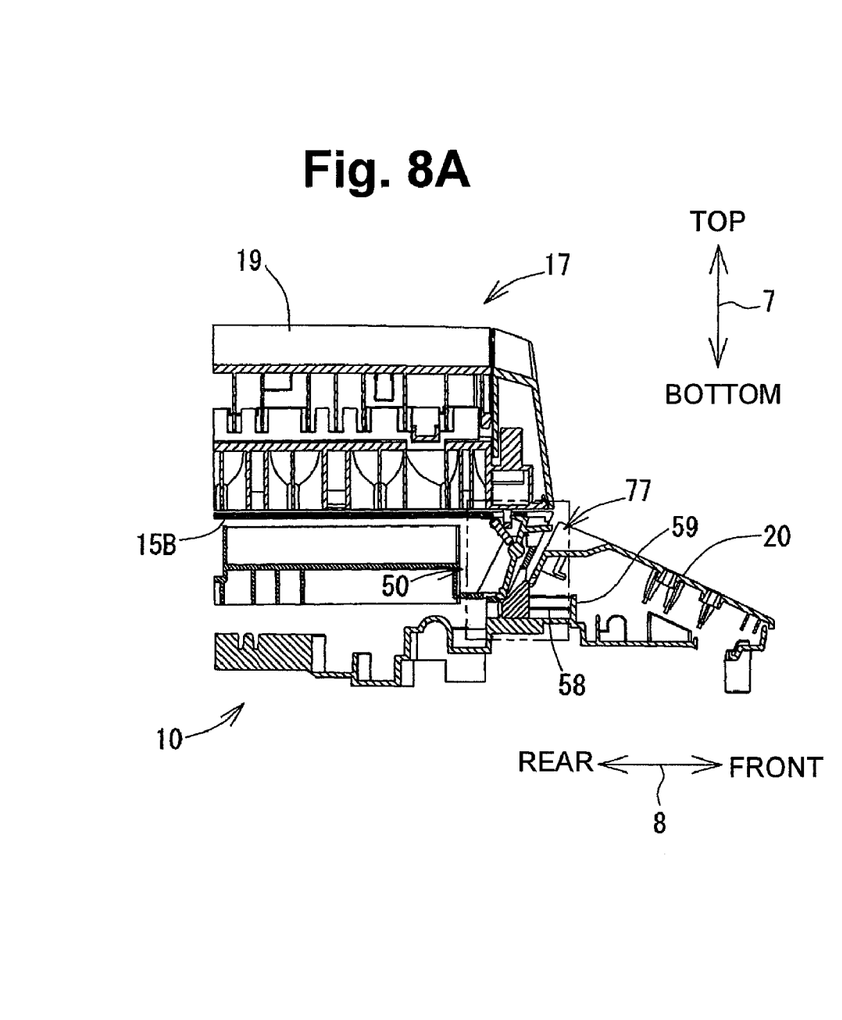
FIG. 8A is a partly cross-sectional view of the multi-function apparatus immediately before the image reading unit is closed taken along the cutting line II-II.
Figure 8B:
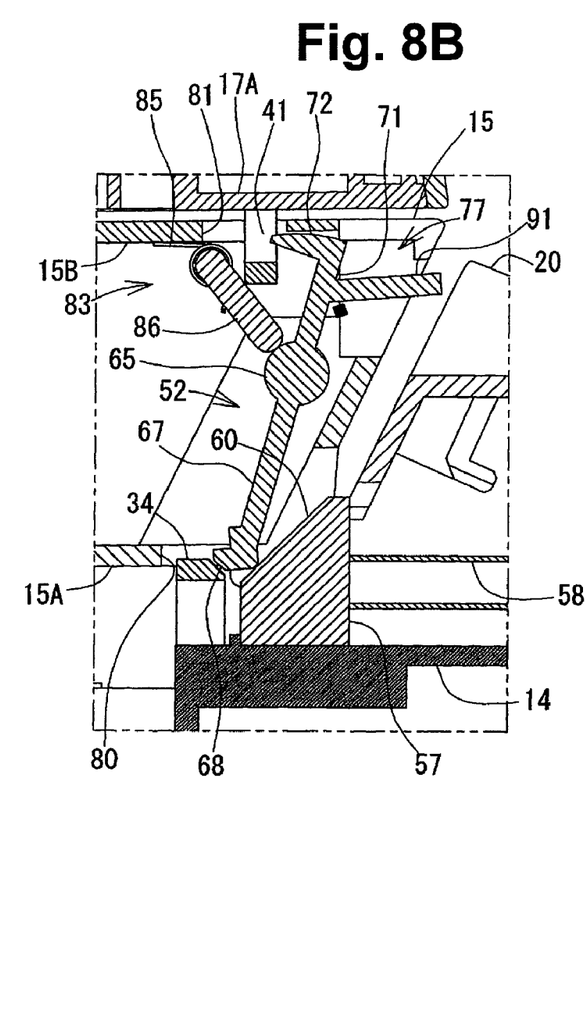
FIG. 8B is a partly enlarged cross-sectional view of the locking mechanism immediately before the image reading unit is closed taken long the cutting line II-II.

When the image reading unit 15 is returned back to the closed position, the first hook 68 is guided rearward and obliquely downward along the guide surface 60 by the guide surface 60 of the guide member 57 entered into the opening 80 in the process of the returning action as shown in FIG. 8. Then, by being pressed downward immediately before the image reading unit 15 assumes the closed position, the first hook 68 is arranged at a position which allows engagement with the first engaging strip 34 and, simultaneously, the rearward urging force applied by the coil spring 58 is transmitted to the first hook 68 via the guide member 57 to bring the first hook 68 into engagement with the first engaging strip 34. Accordingly, the pivoting member 52 assumes the first pivotal position.

As described above, in this embodiment, the document cover 17 and the image reading unit 15 are prevented from assuming the opened position simultaneously by the locking mechanism 50. In other words, when one of the document cover 17 and the image reading unit 15 assumes the opened position, the other one of those is reliably locked in the closed position, so that the image printing apparatus having high reliability is provided. Also, it is advantageous in terms of reduction of upsizing of the apparatus due to the locking mechanism.

[Modification]

Figure 9:
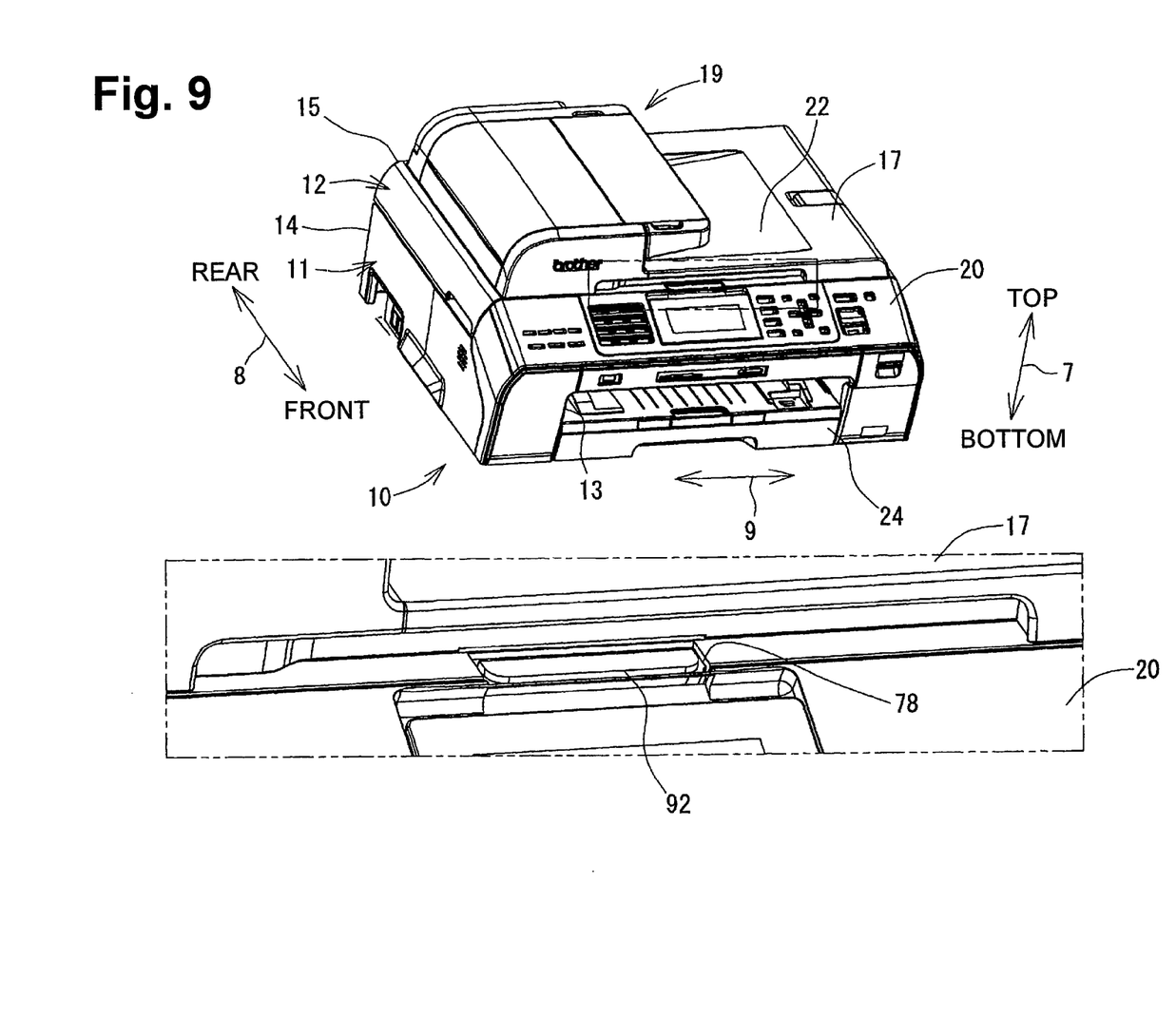
FIG. 9 is a drawing showing the operation lever according to a modification of a lever member.
Figure 10:
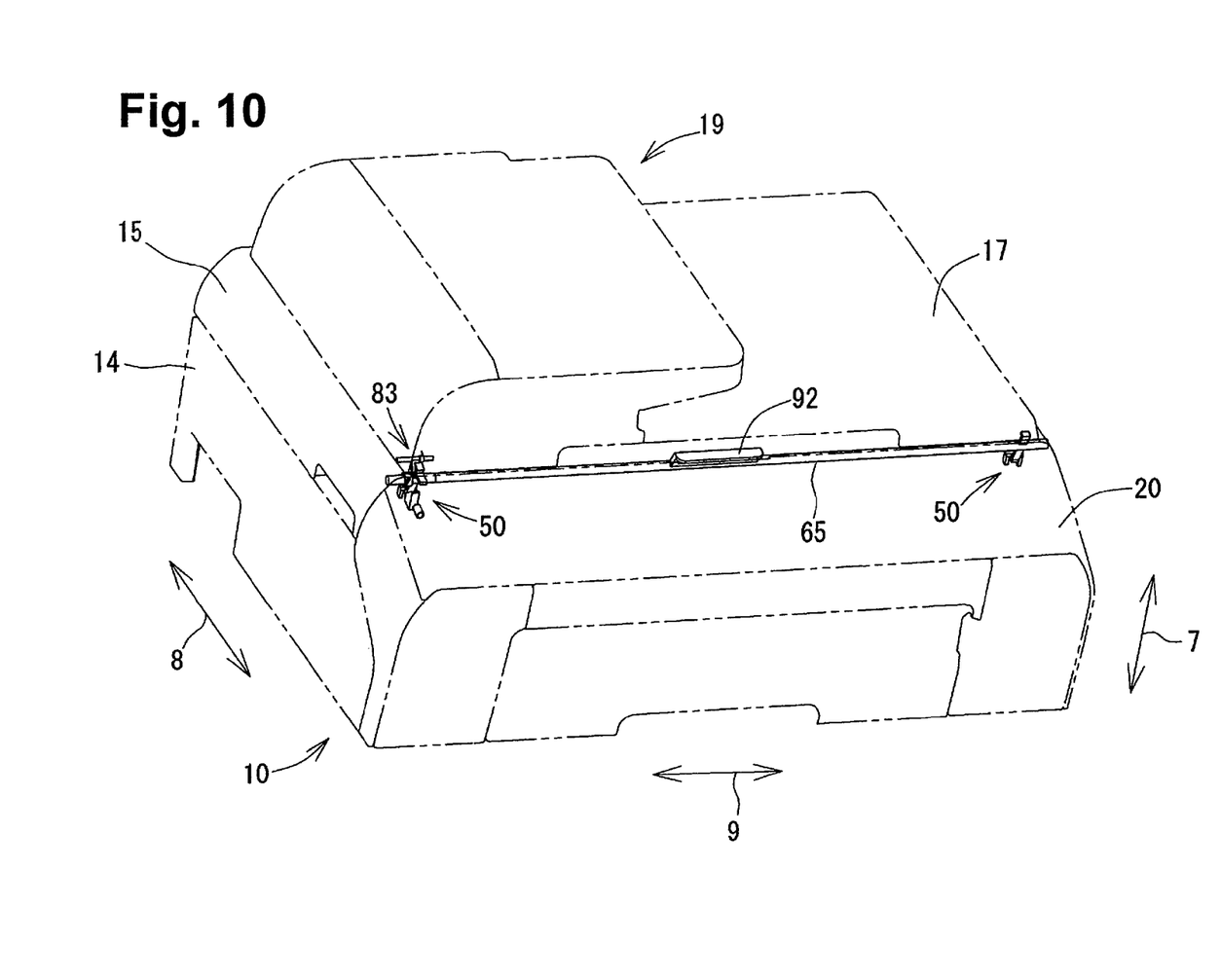
FIG. 10 is a diagrammatic drawing showing positions of the operation lever and the locking mechanism in the multi-function apparatus 10.

The operation lever 91 is arranged in the notched groove 77 formed at the left end portion of the operation panel 20 in the embodiment described above. However, as shown in FIG. 9, a configuration in which an operation lever 92 is arranged in a notched groove 78 formed at the center of the operation panel 20 is also employable. The operation lever 92 extends in the lateral direction 9 as shown in FIG. 10 and is connected to the supporting shaft 65 directly or indirectly via a link member or the like. Even with the operation lever 92 as described above, a desired external force can be applied to the pivoting member 52 by the operation of the user. In such a case, the locking mechanisms 50 may be provided at both ends of the supporting shaft 65 as shown in the drawing. In this manner, by the arrangement of the locking mechanisms 50 on the left and the right sides, locking of the image reading unit 15 and the document cover 17 is ensured.

In this embodiment, the document cover 17 and the image reading unit 15 are rotatably supported at the rear portion of the apparatus individually. For example, however, the invention can be applied to a configuration in which the image reading unit 15 is rotatably supported at the left end of the apparatus, and the document cover 17 is rotatably supported at the rear portion of the apparatus.

While the invention has been described in connection with embodiments, it will be understood by those skilled in the art that other variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

The arrangement of the locking mechanism 50 may be modified variously. A part of the locking mechanism can be disposed any one of the body 10, the image reading unit 15 and the document cover 17. For example, the relation between the locking mechanism 50 and the body 10 and the relation between the locking mechanism 50 and the document cover 17 is replaceable.

What is claimed is:

1. A multi-function apparatus comprising:
    a body;
    an image reading unit which has a document placing surface and which is configured to read an image of a document placed on the document placing surface, the image reading unit being movable between a closed position to cover an upper portion of the body and an opened position to open the upper portion; and
    a document cover being movable between a closed position to cover the document placing surface and an opened position to open the document placing surface,
    wherein
    the image reading unit includes a locking member,
    the locking member includes a first engaging portion being capable of engaging the body, and a second engaging portion being capable of engaging the document cover,
    the locking member is configured to be movable between a first position and a second position such that
        when the locking member is moved to the first position, the first engaging portion engages the body and the image reading unit is locked to the closed position, and the second engaging portion is disengaged from the document cover, so that the document cover is movable to the opened position,
        when the locking member is moved to the second position, the first engaging portion is disengaged from the body and the image reading unit is allowed to move to the opened position, and the second engaging portion engages the document cover, and the document cover is locked to the closed position,
    wherein the multi-function apparatus further comprises:
        a first urging member which urges the locking member at the second position when the image reading unit is in the opened position; and
        a second urging member which urges the locking member at the first position when the document cover is in the opened position.

2. The multi-function apparatus according to claim 1, further comprising:
    an operation member configured to move the locking member from the first position to the second position; and
    a restriction member configured to lock the locking member at the first position.

3. The multi-function apparatus according to claim 2, wherein the operation member is exposed to an outside to be manually operated by a user.

4. The multi-function apparatus according to claim 1, wherein the locking member is configured to pivot between the first position and the second position about an axis.

5. The multi-function apparatus according to claim 1, wherein the first urging member includes a first spring.

6. The multi-function apparatus according to claim 1, wherein the second urging member includes a second spring.

7. The multi-function apparatus according to claim 1, wherein
    the first engaging portion includes a first arm member extending from a supporting shaft of the locking member and a first hook provided at a distal end of the first arm member and being engageable with the body, and
    the second engaging portion includes a second arm member extending from the supporting shaft and a second hook provided at a distal end of the second arm member and being engageable with the document cover.

8. The multi-function apparatus according to claim 1, wherein the second urging member includes a guide configured to guide the first engaging portion to an engaged portion provided on the body in association with the movement of the image reading unit from the opened position to the closed position.

9. The multi-function apparatus according to claim 1,
    wherein the image reading unit is rotatable with respect to the body about an axis positioned at a rear side of the multi-function apparatus, and
    the document cover is rotatable with respect to the image reading unit about an axis positioned at the rear side of the multi-function apparatus.

10. The multi-function apparatus according to claim 1, wherein the document cover includes an auto document feeder configured to transport the document to a reading position.

* * * * *